United States Patent [19]
Dunn et al.

[11] 3,752,003
[45] Aug. 14, 1973

[54] COMPOSITE HEAVY-DUTY MACHINE ELEMENT AND METHOD OF MAKING THE SAME

[75] Inventors: William M. Dunn, Farmington; Myron C. Sarnes, Northville, both of Mich.

[73] Assignee: Federal-Mogul Corporation, Southfield, Mich.

[22] Filed: Dec. 4, 1970

[21] Appl. No.: 95,310

[52] U.S. Cl............................... 74/434, 29/159.2
[51] Int. Cl....................... F16h 55/04, B21d 53/28
[58] Field of Search........................ 29/159.2; 74/434

[56] References Cited
UNITED STATES PATENTS

| | | | |
|---|---|---|---|
| 2,331,909 | 10/1943 | Hensel et al.................. | 29/159.2 |
| 2,704,465 | 3/1955 | Haller............................ | 74/434 |
| 2,447,434 | 8/1948 | Schwarzkopf................ | 74/434 UX |
| 2,561,579 | 7/1951 | Lenel............................. | 74/434 |
| 2,767,438 | 10/1956 | Pingel............................ | 74/434 X |

*Primary Examiner*—Leonard H. Gerin
*Attorney*—Barthel & Bugbee

[57] ABSTRACT

A composite heavy-duty machine element, such as a face gear (FIG. 7), has its working or load bearing portion composed on sintered powdered high-performance alloy while its supporting portion not subjected to concentrated or intense heavy loads is made of a base metal such as sintered powdered iron. In FIGS. 1 through 8 the powders of the two portions are inserted separately and successively in the die cavity of a briquetting process and simultaneously compacted to form a composite briquette which is then sintered to bond the separate portions together even though they are of different materials with different physical characteristics. The face gear as briquetted and sintered is then subjected to a further deforming operation to further incline its teeth. The resulting composite sintered powdered metal face gear is of lower material cost than such an element formed of high-performance alloy in its entirety, and may then be used as it is of satisfactory density for its intended use, or it may be further densified by means of an additional compressing operation with the article cold, warm or by a hot forging operation, or with subsequent sintering if deemed necessary depending upon its intended use.

5 Claims, 8 Drawing Figures

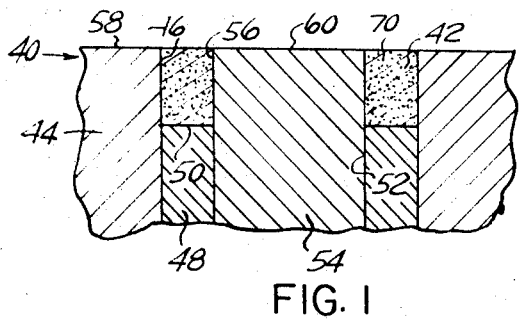
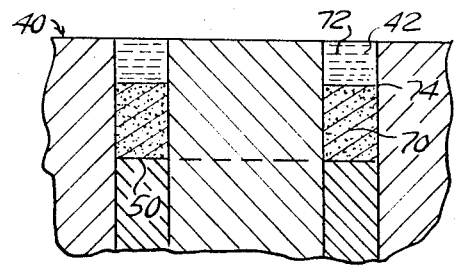
FIG. 1  FIG. 2
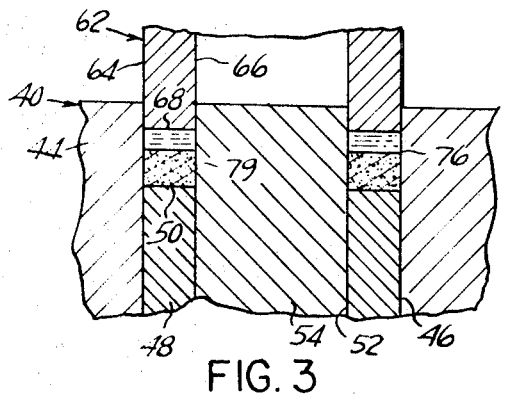
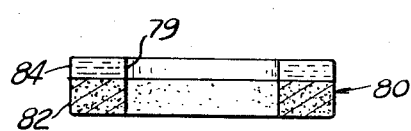
FIG. 3  FIG. 4
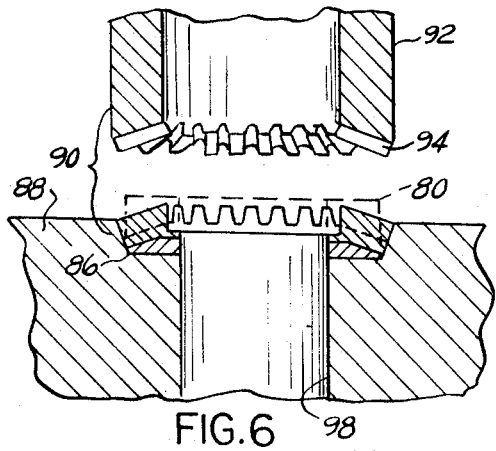
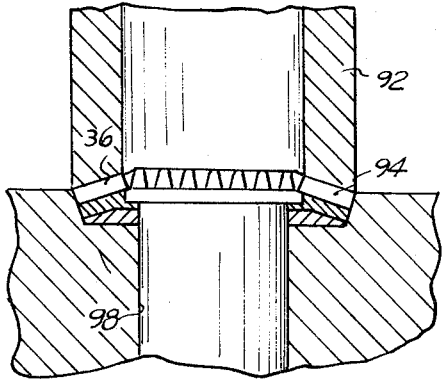
FIG. 6  FIG. 5
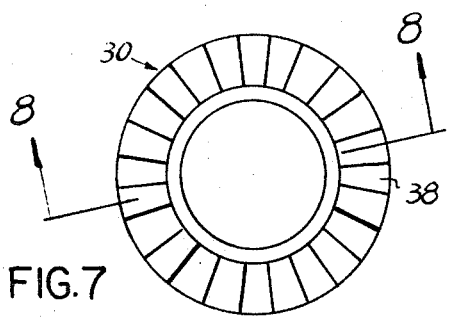
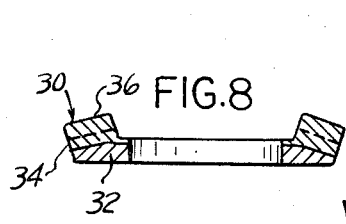
FIG. 7  FIG. 8
INVENTORS
WILLIAM M. DUNN
MYRON C. SARNES
BY Barthel & Bugbee
ATTORNEYS

3,752,003

COMPOSITE HEAVY-DUTY MACHINE ELEMENT AND METHOD OF MAKING THE SAME

BACKGROUND AND SUMMARY OF INVENTION

Heavy-duty machine elements which are subjected to high loads or stresses have hitherto been formed as forgings from high-cost nickel-content alloys which in themselves are very expensive and which consequently cause such machine elements made therefrom to be likewise very expensive. Nevertheless, in such machine elements only a portion thereof is ordinarily subjected to concentrated heavy loads, torques or stresses which require the use of high performance alloys, yet the formation of the entire machine element from such high performance alloys has hitherto been necessitated, requiring high cost forging operations in its production.

The present invention overcomes these prior disadvantages by providing heavy-duty machine elements wherein the working portions subjected to heavy or concentrated loads, torques or other stresses are formed from sintered powdered high-performance alloys whereas the remaining portions not so loaded are formed from sintered powdered low-performance metals. The two portions are bonded to one another inseparably as a result of their being sintered together. As a result, the quantity of high-cost, high-performance alloy in each machine element is greatly reduced in comparison with the same machine element forged from solid high-performance alloy throughout, with a corresponding reduction in the ultimate cost of the finished machine element as well as a conservation of nickel and other expensive metals. At the same time, the heavy-duty performance capability of the composite machine element is preserved without entailing the high cost previously accompanying the production of forged unitary high-performance machine elements. Moreover, test specimens made according to this invention and subjected to tensile strength tests in tension testing machines show that rupture of such specimens occurs at locations spaced away from the junctions between the two metals and not at such junctions.

IN THE DRAWINGS

FIG. 1 is a central vertical section through the die cavity of a briquetting press showing the filling thereof with low-cost base metal powder for the production of a face gear;

FIG. 2 is a view similar to FIG. 1 but with the lower punch moved downward and the resulting space filled with high-performance alloy powder;

FIG. 3 is a view similar to FIGS. 1 and 2 but showing the composite powdered metal charge in the die cavity being compacted into a briquette;

FIG. 4 is a central vertical section through the composite powdered metal blank obtained after sintering the briquette shown in FIG. 3;

FIG. 5 is a central vertical section, partly in side elevation, through a deforming die set showing the sintered composite powdered metal blank of FIG. 4 at the end of its deformation into a face gear, with the tooth-forming upper punch lowered;

FIG. 6 is a view similar to FIG. 5 but with the tooth-forming upper punch raised and with the original shape of the blank shown in dotted lines;

FIG. 7 is a top plan view of the face gear obtained as a result of the operations shown in FIGS. 1 to 6 inclusive; and FIG. 8 is a central vertical section taken along the line 8—8 in FIG. 7.

Referring to the drawings in detail, FIGS. 1 to 8 inclusive show the preparation, according to this invention, of a composite heavy-duty bevel face gear, generally designated 30 (FIGS. 7 and 8) as consisting of an annular hub or core portion 32 of low performance sintered powdered material, such as sintered powdered iron, to the face of which is bonded, by sintering, an annular toothed peripheral portion 34 of high performance sintered powdered alloy metal described below, the teeth 36 being inclined outward relatively to the axis of the gear 30. The hub or core portion 32 forms the supporting portion of the gear 30 by which the latter is mounted upon its driving or driven element, and is not subjected to the concentrated stresses and loads as is the peripheral toothed portion 34. The teeth 36 are separated from one another by their respective tooth spaces or grooves 38.

In the production of the bevel ring gear or face gear 30 of FIGS. 7 and 8, there is employed a conventional briquetting press, generally designated 40, of which only the working parts adjacent the die cavity 42 are shown. These parts are the die 44 with its die bore 46 forming the outer boundary of the die cavity 42, the tubular lower punch 48 being adjustably movable upward or downward within the die bore 46 and having an annular top or upper surface 50 and a central bore 52. Mounted within the bore 52 of the tubular lower punch 48 is a core rod 54 having an external cylindrical surface 56 forming the inner boundary of the die cavity 42. The die 44 and core rod 54 ordinarily have substantially flat upper surfaces 58 and 60 respectively. Movable upward and downward within the die cavity 42 is a tubular upper punch 62 having cylindrical outer and inner surfaces 64 and 66 respectively and a lower end 68 provided with alternating radial teeth 67 and grooves 69 shaped to form in the compact or briquette the tooth profile and intertooth spaces desired, the surfaces 64 and 66 snugly but slidably engaging the die and core rod surfaces 46 and 56 respectively while the toothed lower end 68 performs the pressing operation with the top surface 50 of the lower punch 48 serving as a temporarily stationary abutment. The upper punch 62 is customarily connected to and movable by a press platen which in turn is moved upward or downward by a hydraulic piston or mechanically by a connecting rod actuated by a crank on a crankshaft which is rotated by an electric motor (these conventional press parts not shown).

Prior to performing the first step in the process of the present invention, let it be assumed that the top surfaces 58 and 60 of the die 44 and core rod 54 are in the same plane and that the lower punch 48 has been moved downward until its top surface 50 is located at the desired depth for the die cavity 42. The operator then operates the press 40, filling the conventional filling shoe thereof (not shown) with low-performance metal powder such as powdered iron or low-carbon steel. He then moves the filling shoe across the top surfaces 58 and 60 of the die 44 and core rod 54 over the top of the die cavity 42, consequently filling the die cavity 42 with an initial charge 70 of low performance metal powder whereupon the filling shoe is then retracted.

Having performed the initial fill of the die cavity 42 with the initial low-performance powdered alloy charge 70, the operator now actuates the mechanism of the press 40 to lower the upper surface 50 of the lower punch 48 to a new and lower level (FIG. 2), likewise causing the low-performance powdered metal charge 70 to descend correspondingly in the die cavity 42. The operator then fills the filling shoe with a final charge 72 of high performance alloy powder capable of sustaining abnormally high or concentrated stresses or loads, and causes the shoe to move across the top surfaces 58 and 60 of the die 44 and core rod 54 over the top of the die cavity 42, consequently filling the die cavity 42 with a final charge 72 of high performance alloy powder, whereupon the filling shoe is again retracted.

Such a high-performance alloy may consist, for example, of the so-called "S.A.E. 4600" modified alloy, the standard composition of which is ordinarily as follows:

| 0 to 0.25% | Mn. | |
|---|---|---|
| 1.75 to 2.00 % | Ni. | the remainder being Fe. |
| 0.35 to 0.60% | Mo. | |

The standard "S.A.E. 4600" alloy of which the above is a modification has the following composition:

| 0.45 to 0.65% | Mn. | |
|---|---|---|
| 1.65 to 2.00% | Ni. | the remainder being Fe. |
| 0.20 to 0.30% | Mo. | |
| 0.20 to 0.35% | Si. | |

The silicon component is omitted in the modified alloy because silicon is detrimental to the working life of a die set. It is ordinarily inserted in the above standard alloy in order to increase the fluidity of the molten alloy during the casting of intricate shapes.

The operator now sets in motion the press platen operating mechanism to cause the platen (not shown) and the tubular upper punch 62 thereon to move downward into the die cavity 42 (FIG. 3), compressing therein the composite powdered metal charge 74 into a composite briquette or compact 76 with radial teeth 77 and tooth spaces 78 on its upper side and with a bore 79 formed by the core rod 54. A pressure of 25 to 35 tons per square inch is employed, depending upon the density desired for the composite briquette 76. The composite compact or briquette 76 is then ejected from the die cavity 42 by moving the lower punch 48 upward and is sintered in a non-oxydizing or reducing atmosphere, such as hydrogen, in a conventional sintering oven at the usual times and temperatures familiar to those skilled in the powder metallurgy art. The sintered composite powdered metal blank 80 (FIG. 4) with its face teeth 67 and tooth spaces 69 thus produced is removed from the furnace with its low performance component 82 firmly and inseparably bonded to its high performance component 84.

To form the bevel ring gear 30 from the composite sintered powdered metal blank 80, the latter is placed in the die cavity 86 (FIG. 5) of the die 88 of a forming die set 90 having a tubular punch 92 with multiple circumferentially-spaced radial tooth-profile-forming projections 94 and tooth spaces 95 arranged at obtuse angles to one another around the lower end 96 thereof and shaped to substantially the same tooth profiles and tooth spaces as the teeth 77 and tooth spaces 78, so as to mate with the teeth and tooth spaces on the blank 80. The die 88 has a central bore 98 therein.

The operator now operates the forming press mechanism to cause the forming die punch 92 to move downward into the die cavity 86 (FIG. 6), whereupon the tooth-forming projections 94 deform the toothed upper face of the upper high performance portion 84 of the composite blank 80 into the multiple teeth 36 and their respective intervening tooth spaces or grooves 38 while at the same time bending and thus deforming the rim of the blank 80 outward into the die cavity 86 to produce the bevel face gear 30 with its outwardly inclined teeth 36 (FIGS. 7 and 8).

I claim:
1. A composite heavy-duty face gear comprising
an annular mounting member of low-performance sintered powdered metal particles,
and an annular working member of high-performance sintered powdered metal alloy particles disposed in coaxial face-to-face engagement therewith and secured thereto in interlocking-particle relationship at the junction therebetween, said working member having an annular array of gear teeth thereon inclined relatively to the axis of said members.

2. A composite heavy-duty machine element, according to claim 1, wherein said gear teeth are inclined at obtuse angles relatively to the axis of said members.

3. A composite heavy-duty machine element, according to claim 1, wherein said gear teeth are inclined at obtuse angles relatively to the axis of said members, and wherein said junction is substantially frustoconical.

4. A method of making a composite heavy-duty face gear comprising
confining an annular mass of low-performance powdered metal particles in an annular enclosure,
confining an annular mass of high-performance powdered metal alloy particles in said annular enclosure in face-to-face engagement with said first-mentioned annular mass to form a composite mass,
compacting said composite mass in said annular enclosure,
forming circumferentially-spaced gear teeth inclined relatively to the axis of said composite mass on a face of said composite mass simultaneously with the compacting thereof,
sintering said composite mass,
and thereby joining said masses to one another in surface-to-surface coaxial relationship with their respective particles at the junction between said masses disposed in interlocking engagement.

5. A method, according to claim 4, including further inclining said teeth relatively to the axis of said composite mass by deforming said sintered composite mass subsequent to formation of said teeth and subsequent to sintering of said composite mass.

* * * * *